Figure 1:
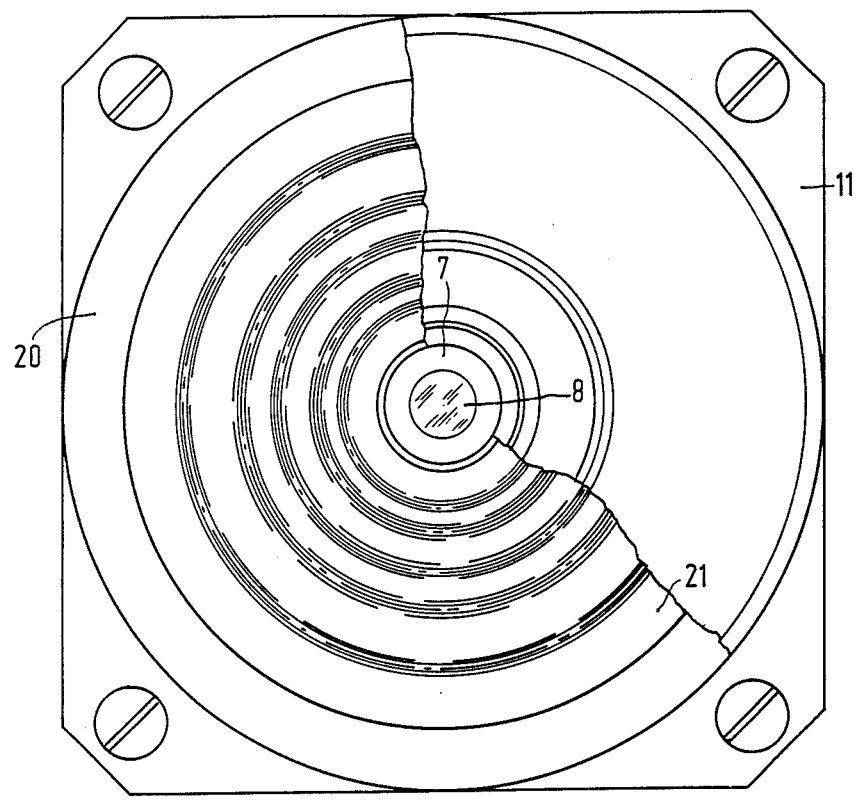

United States Patent [19]

Gijzen et al.

[11] Patent Number: 4,773,055
[45] Date of Patent: Sep. 20, 1988

[54] VIDEODISC FOCUSING AND TRACKING SERVO

[75] Inventors: Wilhelmus A. H. Gijzen; Wilhelm J. Kleuters; Bob Hoekstra; Gerard E. Van Rosmalen, all of Eindhoven, Netherlands

[73] Assignee: U.S. Philips Corporation, New York, N.Y.

[21] Appl. No.: 119,306

[22] Filed: Nov. 6, 1987

Related U.S. Application Data

[63] Continuation of Ser. No. 347,606, Feb. 10, 1982, abandoned.

[30] Foreign Application Priority Data

Nov. 10, 1981 [NL] Netherlands ................ 8105072

[51] Int. Cl.[4] ............................................. G11B 7/095
[52] U.S. Cl. ......................................... 369/45; 369/44; 350/235; 250/201; 250/202
[58] Field of Search ............... 369/45, 44, 111, 112; 350/235, 252; 250/201, 202

[56] References Cited

U.S. PATENT DOCUMENTS

| | | | |
|---|---|---|---|
| 3,915,560 | 10/1975 | Levine | 350/255 |
| 3,974,327 | 8/1976 | Dijk | 369/45 |
| 4,003,059 | 1/1977 | Sugiura | 369/45 |
| 4,021,101 | 5/1977 | Comerik | 369/45 |
| 4,135,083 | 1/1979 | Alem | 369/45 |
| 4,135,206 | 1/1979 | Kleuters | 369/44 |
| 4,374,324 | 2/1983 | van Rosmalen | 369/44 |
| 4,453,241 | 6/1984 | Verdonk | 369/112 |

FOREIGN PATENT DOCUMENTS 1570593 7/1980 United Kingdom .................. 369/44

OTHER PUBLICATIONS

"Video Disk Player optics", by Bouwhuis, Applied Optics, Jul. 1978, vol. 17, No. 13, pp. 1993–1999.

Primary Examiner—Alan Faber
Attorney, Agent, or Firm—Thomas A. Briody; Algy Tamoshunas

[57] ABSTRACT

An electro-optical apparatus comprising an objective (7) scans an optical disc (3) having a transparent protective layer (5) by means of a radiation beam (10) which, through the transparent layer, is focussed on a reflecting recording surface (4). The objective moves along the optical axis (19) for focussing the radiation beam on the recording layer and moreover performs limited pivotal movements. The position of the optical axis of the objective is corrected for obliquity of the surface of the optical disc, correction means (22A, B) being provided to tilt the objective through a correction angle, so that the angle between the optical axis and the normal to the disc surface is reduced.

6 Claims, 3 Drawing Sheets

VIDEODISC FOCUSING AND TRACKING SERVO

This is a continuation of application Ser. No. 347,606, filed Feb. 10, 1982, now abandoned.

The invention relates to an electro-optical apparatus for recording and/or reading recording tracks in a reflecting recording surface of an optical disc by means of a radiation beam, which disc has a transparent protective layer having a plane surface over the entire area of the recording surface. In such an apparatus the radiation beam is incident on the disc surface, traverses the transparent layer, and is reflected by the recording surface. Thereafter the reflected radiation again traverses the transparent layer and subsequently emerges from the disc surface. The electro-optical apparatus comprises: a frame; an objective having an optical axis and a lens system for concentrating the radiation beam to form a radiation spot. The objective is mounted in a bearing arrangement which permits limited pivotal movements of the optical axis of the objective relative to a neutral position about at least one pivotal axis perpendicular to the optical axis.

Electro-optical apparatus of this type are, for example, employed in optical video-disc players, optical audio-disc players and optical storage-disc equipment. The radiation beam may be produced by a laser and the objective concentrates the laser beam so as to form a light spot of very small dimensions. The minimum dimension of the light spot is determined by the wavelength of the light source and the numerical aperture of the objective lens. The light spot comprises a bright central portion surrounded by concentric rings of substantially lower intensity. The intensity of the first ring is approximately 2% of the intensity in the center of the light spot. If the center of the light spot is located at a recording track, a part of the light will also be incident on the adjacent tracks. The light which is reflected and which ultimately reaches the light-sensitive electronic means therefor not only contains the information relating to the desired recording track but also some information relating to adjacent tracks. For a more extensive description of the optics used in optical video-disc players and problems associated therewith, reference is made to the article "Video disk player optics" by G. Bouwhuis and J.J.M. Braat, Applied Optics, Volume 17, No 13/1, July 1978. (Herewith incorporated by reference). The resulting cross-talk between adjacent recording tracks depends to a great extent on the light distribution in the light spot on the recording surface. The light distribution in the light spot is influenced not only by the optical quality of the optical system forming the light spot and the quality of the light source itself, but also by the obliquity of the disc surface. Said obliquity mainly gives rise to coma and increases the light intensity at one side of the central portion, namely in the first ring of the intensity distribution of the light spot, that is, in the direction in which the disc surface is inclined. A certain obliquity of the disc surface in a radial direction therefore results in increased cross-talk between the recording tracks scanned by the light spot and the adjacent recording track towards which the portion of the first ring of increased light intensity points.

Current optical video-disc players intended for consumer application employ HeNe-lasers. The industry has put much effort to the development of semi-conductor lasers of the AlGaAs-type, because such lasers are much smaller and potentially cheaper. A comparison between optical video players equipped with HeNe-lasers and AlGaAs-lasers shows that for the same optical bandwidth the numerical aperture of the objective is 0.4 when the objective is used in conjunction with a HeNe-laser having a wavelength of 633 nanometres and the numerical aperture is 0.5 when said objective is used in conjunction with an AlGaAs-laser having a wavelength of 790 nanometres. As the coma caused by obliquity of the disc surface is proportional to the third power of the numerical aperture, the use of AlGaAs-lasers leads to a substantial increase in cross-talk between the recording tracks in the case of obliquity of the disc. Comparative tests reveal that when a HeNe-laser is used the obliquity of the disc should be smaller than $1^0$. When an AlGaAs-laser is used the obliquity should be smaller than $0.5^0$.

The obliquity of an optical disc depends on a number of factors; especially the obliquity in a radial direction is of importance for the cross-talk between the recording tracks. The principal factors to be considered are: various tolerances during manufacture and assembly of the disc player and during manufacture of the disc, incorrect positioning of the disc on the spindle of a disc player, and out-of- flatness of the disc surface under the influence of its own weight. In optical discs comprising two separate disc sections glued to each other back to back, the deformation as a result of stresses in the layer of glue cannot always be ignored.

It is an object of the invention to provide an electro-optical apparatus of the type mentioned in the opening paragraph in which cross-talk between adjacent recording tracks as a result of obliquity of the disc is reduced. The apparatus is characterized in that there are provided automatic correction means for continually and automatically correcting the neutral position of the optical axis during recording and/or reading of the recording tracks by tilting the objective about at least one of said pivotal axes through a correction angle which is related to the direction of the normal to the surface of the optical disc at the location where the optical axis of the objective intersects the optical-disc surface, so as to reduce the angle between the optical axis and the normal in the case of an oblique position of the surface. The correction means comprise first correction means which dictate a desired correction angle and second correction means for tilting the objective through the desired correction angle. Thus, in the electro-optical apparatus in accordance with the invention the oblique position of the optical disc itself is not changed but its effect on cross-talk between adjacent recording tracks is reduced by correcting the position of the objective relative to the surface of the optical disc.

Various embodiments are possible within the scope of the invention. A first group of embodiments of the invention relates to electro-optical apparatus comprising an electrical focussing actuator for moving the objective along the optical axis from a neutral objective position, relative to the frame, in order to focus the radiation spot on the recording surface. The use of an electrical focussing actuator is customary in optical-disc players in view of the vary small depth of focus of the objectives used. The depth of focus is of the order of magnitude of a few microns, so that the inevitable minor variations in the position of the recording surface must be tracked by means of an automatic focusing system. Said first group of electro-optical apparatus in accordance with the invention is characterized in that said first correction means dictate a correction angle which is solely a function of the positional deviation of the objective relative to said neutral objective position. In embodiments belonging to this group the magnitude of a correction angle and thus the degree of tilting of the objective is related directly to the displacement from a neutral position relative to the frame to which the objective is subjected for the purpose of the focussing. Optical discs are manufactured within specific tolerances, so that each disc will not exhibit the same deformation. By means of measurements on a larger number of optical discs which are representative of a normal fabrication process it is possible to determine a relationship between the objective position and the desired correction angle such that, statistically in improvement of the average cross-talk is obtained.

A subgroup of said first group of embodiments is characterized in that the first correction means belong to the objective bearing arrangement and comprise mechanical guide means for guiding the objective along a curved path during focussing movements, and the second corrections means comprise the focussing actuator. In such embodiments the relationship between the objective position and the correction angle is established mechanically in the bearing arrangement of the objective. The focussing actuator moves the objective up and down along its optical axis, the bearing arrangement of the objective ensuring at the same time that, depending on the objective position, the objective is tilted to a specific extent. A suitable embodiment may for example be characterized in that: the objective bearing arrangement connects the objective to the frame by means of a pivotal device; the pivotal device, the objective and the frame together constitute a system which behaves as a quadrangular linkage, the objective and the frame forming opposite sides of the quadrangular linkage and the other two sides belonging to the pivotal device; and said two other sides form an acute angle with each other. Preferably, an embodiment is used which is characterized in that said other two sides of the quadrangular linkage comprise two spaced leaf springs which are rigidly connected to the objective and the frame. Electro-optical equipment is known which employs a parallel objective guide-system comprising two parallel leaf springs. In comparison with such known electro-optical equipment the last-mentioned embodiment presents an improvement which can be obtained with a very small number of components. Indeed, it is necessary only to arrange the leaf springs in a slightly oblique position. Calculations demonstrate that the angle between the two leaf springs may, for example, be of the order of magnitude of 6°.

A further embodiment of the invention in which the first correction means belong to the objective bearing arrangement is characterized in that: the mechanical guide means comprise a first bearing arrangement and a second bearing arrangement for the objective. The first and the second bearing arrangement guide the objective at locations which, viewed along the optical axis of the objective, are axially spaced from each other; and the first and the second bearing arrangement guide the objective in a first and a second direction respectively, which directions make an angle with each other. This embodiment of the invention can be implemented in several ways, two of these will be described in more detail in the following description.

It may be advantageous to use an embodiment which is characterized in that the first and second bearing arrangements each comprise: at least one straight guide rod which is rigidly connected to the frame and a sleave bearing which is connected to the objective and which slides along the associated guide rod.

Some known electro-optical apparatuses for use in opticaldisc players comprise an objective which in addition to translational focussing movements can perform pivotal movements in order to enable oscillations of the recording track to be followed by the read spot. Electro-optical equipment of this type is, known from, for example, U.S. Pat. No. 4,135,083 herewith incorporated by reference. Said known electro-optical apparatus comprises an electrical objective tilting device for tiling the objective under the influence of a tilting signal. The first group of embodiments of the invention also includes electro-optical apparatus of this type, which are characterized in that: the apparatus comprises electrical objective- position detection means which supply an electric position signal which depends on said objective position; the first correction means comprise an electric correction circuit to which the position signal is applied and whose output signal is a correction signal which is solely a function of the difference between said position signal and a constant signal, which output signal is applied to the second correction means; and the second correction means comprise the objective tilting device. In this embodiment the positional deviation of the objective as a result of the focussing movements and the required correction angle are also related to each other. However, this relationship is not mechanically implemented in the bearing arrangement of the objective, but electrically in an electric correction circuit.

The said electro-optical apparatus comprising an electrical objective tilting device may belong to a second group of embodiments of the invention which is characterized in that the first correction means comprise an angle detector supplying an angular-error signal which depends on the angle between the optical axis and said normal to disc surface and the second correction means comprise the objective tilting device. In embodiments belonging to this second group the objective is not tilted through a correction angle which is related to the objective position as a result of focussing, but automatic control is applied to correct any deviation of the position of the optical axis of the objective relative to the normal to the disc surface directly and automatically independently of the objective position.

Figure 2:
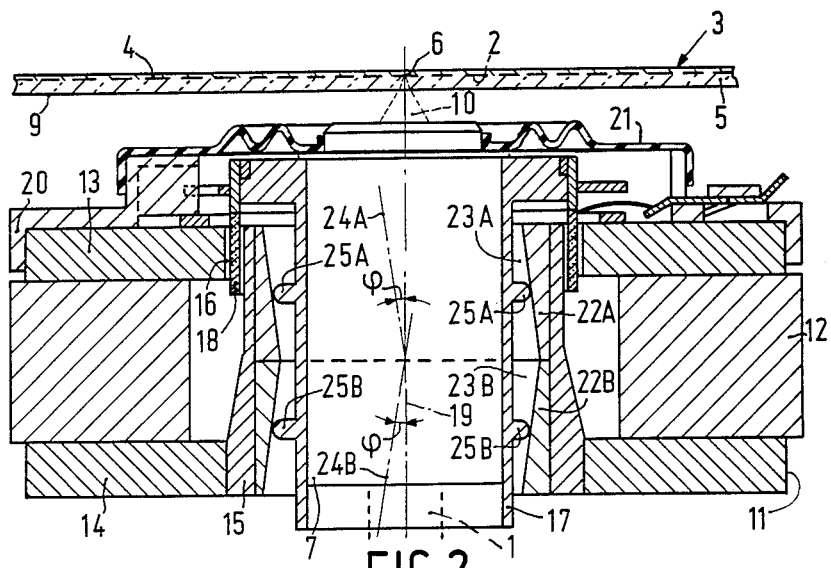
Figure 3:
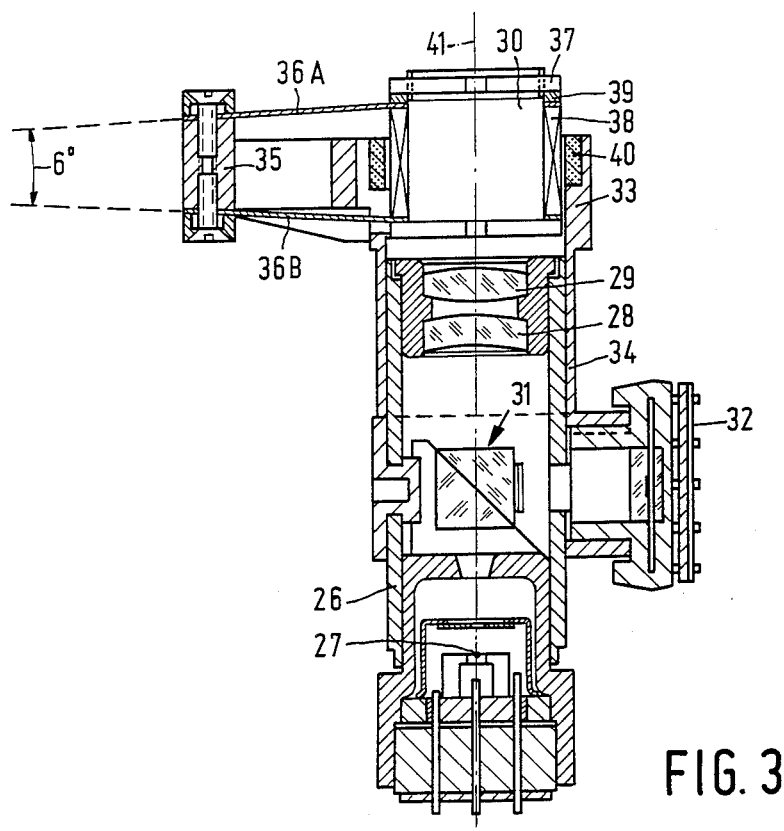
Figure 4:
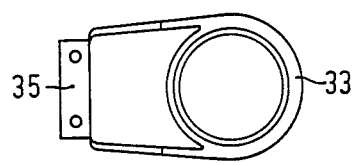
Figure 5:
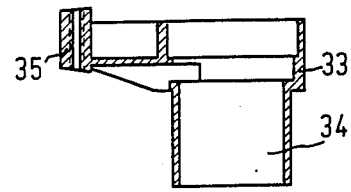
Figure 6:
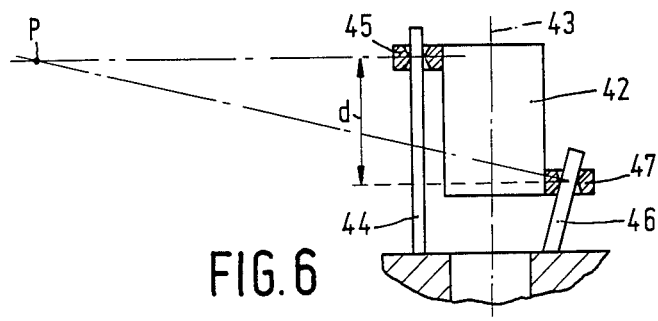
Figure 7:
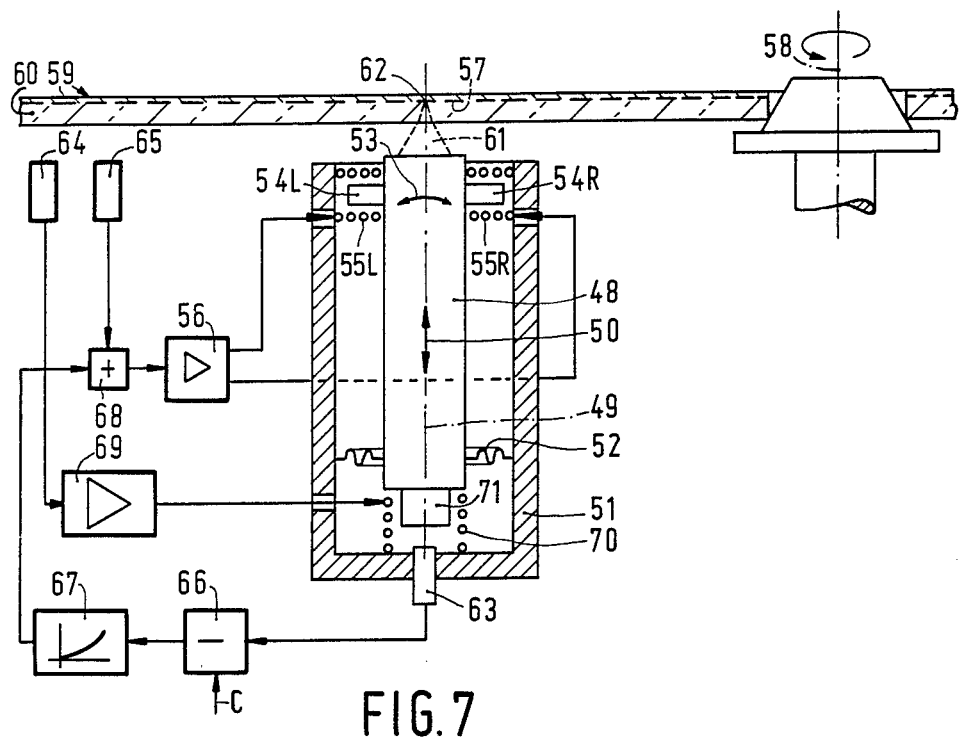
Figure 8:
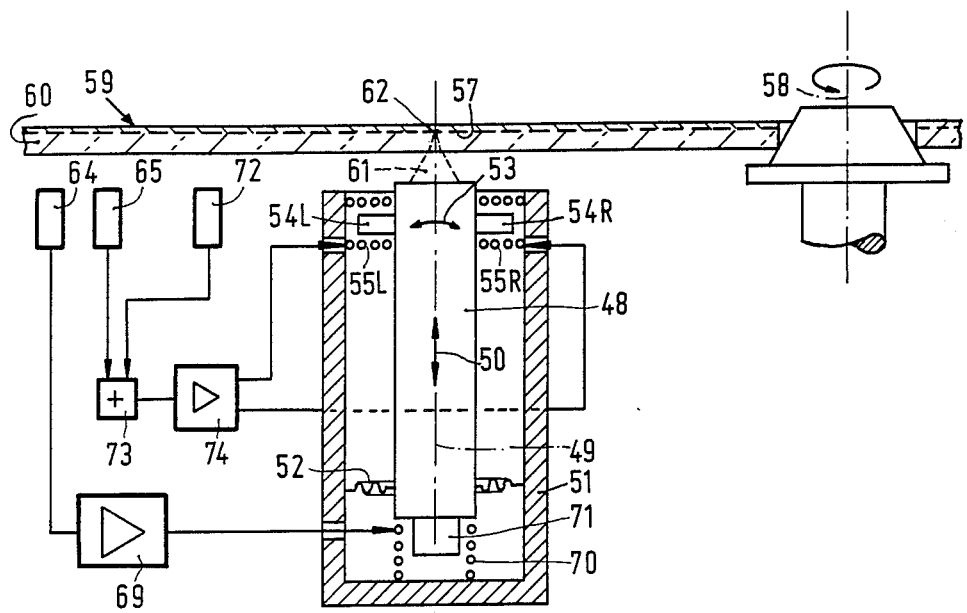

Embodiments of the invention will now be described in more detail, by way of example, with reference to the drawing, in which:

FIGS. 1 and 2 are a plan view and a sectional view respectively of an electro-optical apparatus comprising an objective mounted in a sleave bearing arrangement, represented at approximately two times the actual scale, FIG. 3 is a sectional view, at approximately three times the actual scale, of an electro-optical apparatus comprising an objective suspended in leaf springs, FIGS. 4 and 5 are a plan view and a sectional view respectively of a detail, shown at two times the actual scale, of a part of the electro-optical apparatus shown in FIG. 3, FIG. 6 illustrates the principle of an objective mounted on guide rods which make an angle with each other, FIG. 7 is a circuit diagram of an electro-optical apparatus in which the instantaneous objective position relative to the frame during focussing is measured and which comprises an electrical network for determining a correction angle depending on the objective position, and FIG. 8 is the circuit diagram of an electro-optical apparatus comprising an angle detector for measuring the oblique position of the optical-disc surface and automatic control system for correcting the angular position of the objective.

The electro-optical apparatus shown in FIGS. 1 and 2 is a modification of an apparatus known from U.S. Pat. No. 4,021,101 herewith incorporated by reference and is intended for scanning recording tracks in the reflecting recording surface 2 in a video disc 3 by means of a radiation beam 1 emmited by a HeNe-laser. On the recording layer a reflecting metallic layer 4 is formed, so that the recording surface is reflecting. Said surface is covered by a transparent protective layer through which the radiation beam 1 is focussed to form a light spot 6. For this purpose there is provided an objective 7 having a lens sytem which inter alia comprises the lens 8 shown in FIG. 1. The transparent protective layer 5 has a surface 9. The radiation beam 1 is concentrated by the objective 7 to form a radiation cone 10 which is incident on the disc surface, which subsequently tranverses the transparent layer, is reflected by the recording surface 2 and then takes the same path back through the transparent layer 5 and the objective.

The electro-optical apparatus comprises a frame 11 which mainly comprises an axially magnetized permanent annular magnet 12, ferro-magnetic end-plates 13 and 14, and a ferro-magnetic central sleeve 15. Said sleeve is rigidly connected to the end plate 14 and extends through an opening in the end plate 13 which opening is dimensioned so that an air gap 16 is formed between the sleeve 15 and the end plate 13. The objective 7 is mounted in a mounting bush 17 and at its upper side it carries an annular focussing coil 18 which extends into the air gap 16. The mounting bush 17 together with the objective 7 is movable along the optical axis 19 of the objective. Arranged at the top of the apparatus is a cover 20 provided with a flexible cuff 21 which does not impede focussing movements of the objective 7. The mounting bush 17 is slidable in two bearing rings 22A and 22 B which are connected to the frame 11. Said rings have bores 23A and 23B respectively with central axes 24A and 24B respectively, which make opposite angles $\phi$ with the optical axis 19 of the objective. At two levels the mounting bush 17 is formed with projections 25A and 25B respectively, which cooperate with the walls of the bores 23A and 23B. Thus, two axially spaced bearing arrangements for the objectives are obtained, namely bearing ring 22A in conjunction with the projection 25A and bearing ring 22B in conjunction with projection 25B. Said bearing arrangements guide the objective along two axes 24A-B, which enclose an angle of $180°-2\phi$. Thus, the objective is pivotable, to a limited extent, about a pivotal axis perpendicular to the plane of drawing, to left of and outside the drawing.

There are provided first and second correction means for constantly and automatically correcting the neutral position of the optical axis 19 during reading of the recording tracks in the recording surface 2 when the video disc is being played, by tilting the objective about said pivotal axis disposed outside the drawing. Tilting is effected through a correction angle which is related to the direction of the normal to the surface 9 of the video disc at a location where the optical axis 19 of the objective intersects the surface 9 of the video disc. The first correction means define a desired correction angle which is solely a function of the positional deviation of the objective, during focussing, relative to the neutral objective position shown. The mounting bush 17 and the bearing rings 22A and 22B guide the objective in such a way that during focussing movements along the optical axis 19 it follows a slightly curved path. The degree of curvature of the path is determined by the choice of the angle $\phi$ between the central axes 24A and 24B of the bearing rings 22A and 22B and the optical axis 19. The first correction means comprise said mechanical guide means and the second correction means, which tilt the objective through the desired correction angle, comprise the previously mentioned focussing actuator comprising the electric coil 18 and the magnet system. The up and down movement of the objective by means of the focussing coil 8 thus automatically results in the objective being tilted through an angle determined by the bearing means.

The embodiment of the invention shown in FIG. 3 is based on the same principle. The electro-optical apparatus comprises a sleeve 26, a semiconductor-diode laser 27, two stationary lenses 28 and 29, a movable objective 30, a double prism 31, and a radiation-sensitive electrical output unit 32. This embodiment is a modification of an electro-optical apparatus as described previously in U.S. patent application Ser. No. 328,875, filed Dec. 9, 1981 (herewith incorporated by reference).

The objective 30 is mounted on a frame 33 which is slid over the sleeve 26 with a bush 34. It is connected to said frame by a pivotal device. The pivotal device, the objective 30 and the frame together constitute the system which behaves as the nature of a quadrangular linkage. The objective 30 and the part 35 of the frame form the opposite sides of the quadrangular linkage. Two leaf springs 36A and 36B form the two other sides of the quadrangular linkage. Said last-mentioned sides enclose an angle of approximately 6° with each other. The objective 30 is connected to the two leaf springs 36A and 36B by means of a nut 37, between which a cylindrical permanent magnet system 38 and a spacer ring 39 are interposed. A focussing coil 40 is arranged concentrically around the magnet system 38 and form a focussing actuator with said system. During said focussing movements a certain pivotal movement is imparted to the objective about a pivotal axis perpendicular to the plane of drawing at the location of the line of intersection of the extensions of the leaf springs 36A and 36B.

FIG. 6 schematically illustrates an embodiment of the invention which also employs mechanical guides means, comprising a first bearing arrangement and a second bearing arrangement for an objective 42 having an optical axis 43. Said two bearing arrangements, viewed along the optical axis of the objective, are axially spaced from each other by a distance d. The first bearing arrangement comprises two guide rods 44, disposed after each other in a direction perpendicular to the plane of drawing, and sleeve bearings 45 which slide along said rods. The second bearing arrangement comprises a guide rod 46 and a sleeve bearing 47. The bearings 45 and 47 may for example be of precious stone and the guide rods may be rods drawn from silver steel.

FIG. 7 also relates to an embodiment of the invention in which the pivotal movement of the objective is directly related to the objective position as a result of the focussing of the objective. Said electro-optical apparatus may be regarded as a special version of an apparatus known from U.S. Pat. No. 4,135,206, herewith incorporated by reference. For the focussing movements the objective housing 48 is movable along the optical axis 49, which is symbolically represented by a double arrow 50. The objective is suspended in the frame 51 at the underside by means of a corrugated diaphragm 52, which in addition to the said focussing movements also permits pivotal movements of the objective. This is symbolically represented by the double curved arrow 53. The pivotal movements of the objective are obtained by means of an electrical objective tilting device which comprises two rod-shaped magnet systems 54L and 54R at the left hand side and the right hand side respectively of the objective and two tilting actuator coils 55L and 55R respectively which cooperate with said magnet systems. Said coils receive signals from a tilting servo-circuit 56 so that the objective can be tilted electrically. In addition to a lens sytem, the objective housing 48 comprises a solid-state light source and all optical and opto-electronic means required for scanning the recording tracks in the recording surface 57 of an optical disc 59 which rotates about an axis of rotation 58. The disc has a transparent protective layer 60 through which the light beam 61 from the optoelectronic device is focussed to form a light spot 62.

The apparatus comprises electrical objective-position, detection means 63 which supply an electric position signal which depends on the objective position of the objective 48. In principle any known type of optical, capacitive, inductive or other position detector may be employed, which obviously should cooperate with the objective housing 48 without being in contact with it objective housing, in such a way that it does not impede the movements of said objective. Furthermore, as is customary in optical disc players, there are provided a focussing detector 64 and a tracking detector 65. These are shown outside the objective housing 48, merely to illustrate the principle of the invention, but as is known they may also be accommodated in the objective housing 48, because both a focussing signal and a tracking signal can be derived from the information contained in the light beam reflected by the reflecting recording surface 57.

In a circuit 66 a constant signal C is substracted from the signal supplied by the objective-position detector 63. The magnitude of this constant signal is equal to the output signal of the objective-position detector 63 when the objective housing is in a neutral position. The difference signal obtained after subtraction is applied to an electric correction circuit 67, whose output signal is a correction signal which is solely a function of said resulting difference signal supplied by the subtractor circuit 66. The output signal of the correction circuit is added to the signal from the tracking detector 65 in an adder circuit 68 and after addition the resulting signal is applies to the tilting servo-circuit 56. For moving the objective housing 48 along the arrow 50 there is provided a focussing servo-circuit 69 which supplies a signal to a focussing actuactor coil 70 which cooperates with a magnet system 70 underneath the objective housing 48.

The electro-optical apparatus shown in FIG. 8 bears great resemblance to that shown in FIG. 7. For the sake of convenience corresponding parts are designed by the same reference numerals. The difference is that, in addition to the focussing detector 65 and the tracking detector 65, there is provided a third detector co-operate with the disc 59, namely an angle detector 72 which supplies an angular-error signal depending on the angle between the optical axis 49 of the objective and the normal to the surface of the optical disc 59 at a location where it is intersected by the optical axis. The output signal of the angular-error detector is added to the output signal of the tracking detector 65 in an adder circuit 73, the resulting signal being applied to a tilting servo-circuit 74 of the objective tilting device. In opto-electronic equipment of this type three servo-controls are used instead of the customary two, namely a focussing servo-control, a tracking servocontrol and an oblique-position servo-control. The oblique-position of the objective 48 solely depends on the oblique position of the optical disc surface and is not related, at least not directly, to the focussing position of the objective 48.

The angle detector 72 is represented symbolically and may be accommodated in the objective 48 together with the focussing detector 64 and the tracking detector 65. Use may for example be made of an angle detector as described in U.S. Pat. No. 4,374,324, herewith incorporated by reference. The opto-electronic angle detectors described in said Application are used for improving the focussing servo-control. However instead of or in addition to this, they may be used for the purpose of oblique-position servo-control.

What is claimed is:

1. An apparatus for recording and/or reading information tracks in a recording surface of a disk with a beam of radiation, said apparatus comprising means for supporting the disk for rotation in a plane which is parallel to the plane of said recording surface, a frame, an objective having an optical axis and a lens system for converging the radiation beam to a radiation spot, means for supporting said objective in said frame for movement from a neutral position at which said optical axis is at a predetermined position which is perpendicular to said plane of rotation of the disk along a curved path towards and away from said plane of rotation such that during said movement of said objective along said curved path said optical axis continuously tilts with respect to said predetermined position thereof so as to correct for obliqueness of said recording surface of the disk and means for moving said objective so as to focus said spot on the recording surface, said supporting means including a bearing arrangement for supporting said objective in said frame, said bearing arrangement comprising a pivotal device which connects said objective to said frame, said pivotal device, said objective and said frame together forming a qudrangular linkage, said objective and said frame forming opposite sides of said quadrangular linkage and the other two sides of said linkage being formed by said pivotal device, and wherein said two other sides form an acute angle with each other.

2. The apparatus according to claim 1 wherein said other two sides of said quadrangular linkage comprise two spaced leaf springs which are rigidly connected to said objective and said frame.

3. An apparatus for recording and/or reading information tracks in a recording surface of a disk with a beam of radiation, said apparatus comprising means for supporting the disk for rotation in a plane which is parallel to the plane of said recording surface, a frame, an objective having an optical axis and a lens system for converging the radiation beam to a radiation spot, means for supporting said objective in said frame for movement from a neutral position at which said optical axis is at a predetermined position which is perpendicular to said plane of rotation of the disk along a curved path towards and away from said plane of rotation such that during said movement of said objective along said curved path said optical axis continuously tilts with respect to said predetermined position thereof so as to correct for obliqueness of said recording surface of the disk and means for moving said objective so as to focus said spot on the recording surface, said supporting means including mechanical guide means for guiding said objective along said curved path, said guide means comprising a first and second bearing arrangement which guide said objective at locations which are spaced from each other in a direction parallel to said optical axis of said objective so as to guide said objective in a first and second direction, respectively, which directions make an angle with each other.

4. The apparatus according to claim 3 wherein said first and second bearing arrangements each comprise at least one straight guide rod which is rigidly connected to said frame and a sleeve bearing which is connected to said objective and which slides along an associated guide rod.

5. An apparatus for recording and/or reading information tracks in a recording surface of a disk with a beam of radiation, said apparatus comprising means for supporting the disk for rotation in a plane which is parallel to the plane of said recording surface, a frame, an objective having an optical axis and a lens system for converging the beam of radiation to a radiation spot, means for supporting said objective in said frame in a position such that said optical axis is generally perpendicular to said plane of rotation, said objective being supported by said supporting means for axial movement in a direction parallel to said optical axis so as to enable focusing of said spot on said recording surface and for pivotal movement about a pivotal axis which is generally perpendicular to said optical axis, means for detecting focusing errors, means responsive to said focus error detection means for moving said objective in said axial direction so as to correct focusing errors, means for tilting said objective about said pivotal axis, a tracking detector which supplies an electrical tracking signal, an angle detector which supplies an angle error signal representative of the angle between said optical axis and the normal to said recording surface at a location where said optical axis intersects said recording surface, means for adding said tracking and angle error signals, said adding means supplying a further signal representative of the sum of said tracking and angle error signals, and wherein said tilting means is responsive to said further signal.

6. An apparatus for recording and/or reading an information track on a recording surface of a disk with a beam of radiation, said apparatus comprising first means for supporting the disk for rotation in a plane which is parallel to the plane of said recording surface, means for converging the radiation beam along an optical axis into a radiation spot on said recording surface, second means for supporting said beam converging means for movement in a first direction towards and away from said plane of rotation and in a second direction so as to produce movement of the beam transverse to the direction of the track, a focus detector, first control means responsive to said focus detector for controlling the movement of said beam converging means in said first direction so as to maintain said beam focused on said recording surface, a tracking detector and second control means responsive to said tracking detector for controlling the movement of said beam converging means in said second direction so that said radiation spot moves along the track in which the information is recorded or from which the information is read, said second supporting means including mechanical means for guiding the movement of said beam converging means during movement thereof towards or away from said disk in response to said focusing detector, said mechanical guide means guiding the movement of said beam converging means independently of said tracking detector and said second control means along a predetermined path such that the angle between said optical axis and the plane of said recording surface changes in dependence on the amount of displacement of said beam converging means towards or away from the disk so as to correct for obliqueness of said recording surface with respect to said plane of rotation.

* * * * *

UNITED STATES PATENT AND TRADEMARK OFFICE
CERTIFICATE OF CORRECTION

PATENT NO. : 4,773,055
DATED : September 20, 1988
INVENTOR(S) : Wilhelmus A.H. Gijzen et al It is certified that error appears in the above-identified patent and that said Letters Patent is hereby corrected as shown below:

<u>IN THE TITLE</u>

Change   "VIDEODISC FOCUSING AND TRACKING SERVO"

To   --ELECTRO-OPTICAL APPARATUS--

Signed and Sealed this

Fourteenth Day of March, 1989

Attest:

DONALD J. QUIGG

*Attesting Officer*   *Commissioner of Patents and Trademarks*